No. 750,576. PATENTED JAN. 26, 1904.
A. BOLLÉE, PÈRE.
BELT DRIVING GEAR.
APPLICATION FILED MAY 7, 1898.
NO MODEL. 2 SHEETS—SHEET 1.
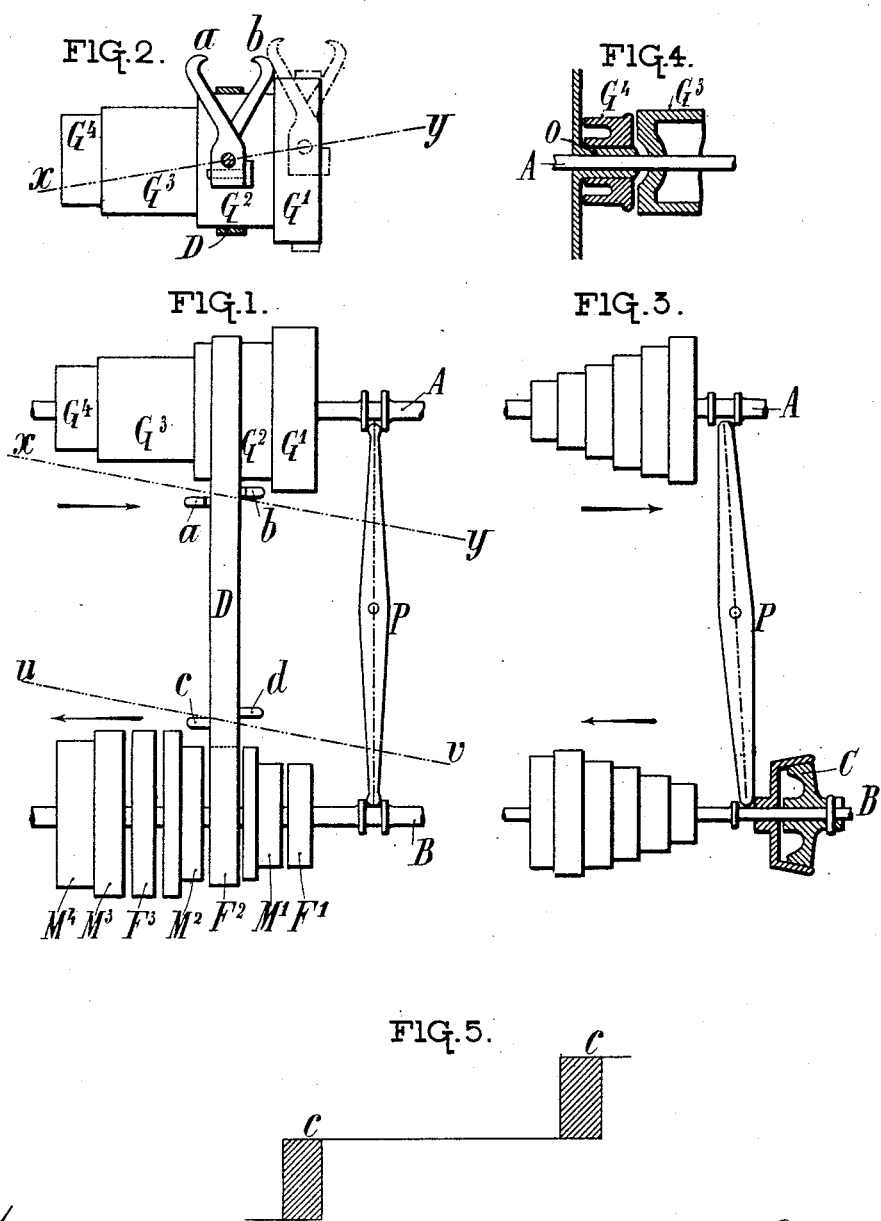

No. 750,576. PATENTED JAN. 26, 1904.
A. BOLLÉE, PÈRE.
BELT DRIVING GEAR.
APPLICATION FILED MAY 7, 1898.
NO MODEL. 2 SHEETS—SHEET 2.
FIG. 7. FIG. 6. FIG. 8.
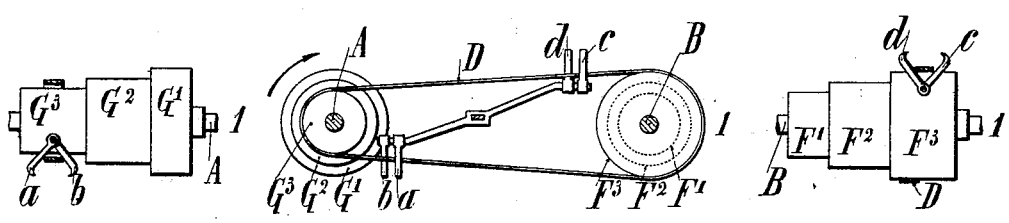
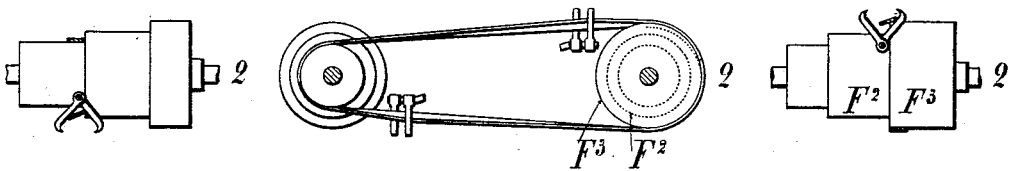
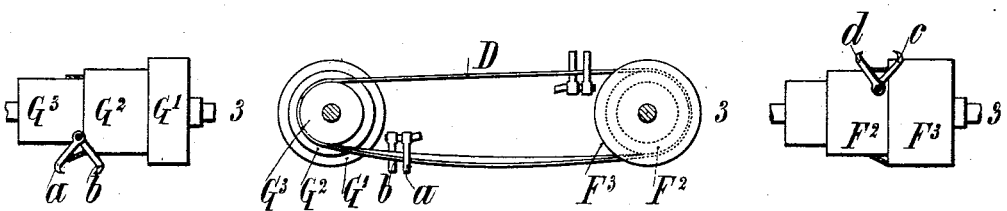
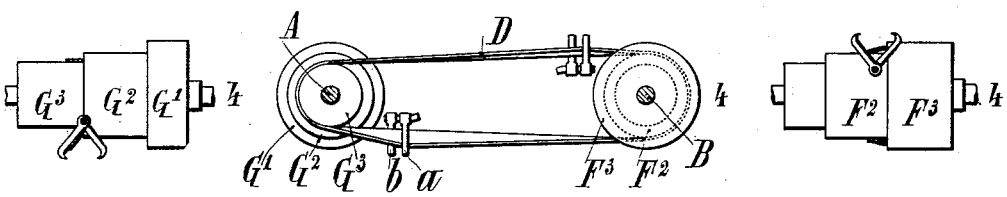
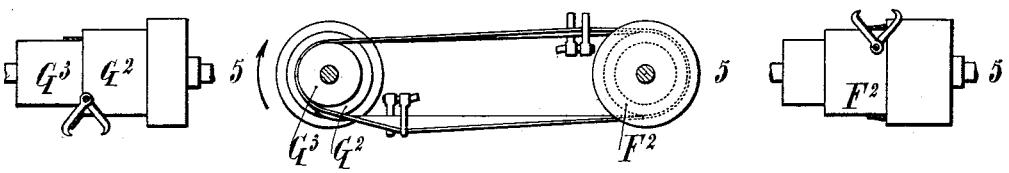
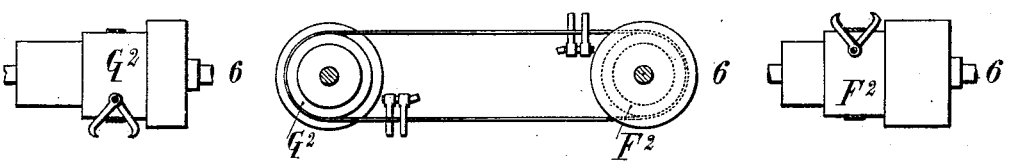
Witnesses:
Inventor:
Amédée Bollée, père.
By his Attorney No. 750,576.                                      Patented January 26, 1904.

UNITED STATES PATENT OFFICE.

AMÉDÉE BOLLÉE, PÈRE, OF LE MANS, FRANCE.

BELT DRIVING-GEAR.

SPECIFICATION forming part of Letters Patent No. 750,576, dated January 26, 1904.

Application filed May 7, 1898. Serial No. 680,036. (No model.)

*To all whom it may concern:*

Be it known that I, AMÉDÉE BOLLÉE, Père, a citizen of the Republic of France, residing at Le Mans, France, have invented certain new and useful Improvements in or Relating to Belt Driving-Gear, of which the following is a specification.

This invention has for its object to couple a driving-shaft to a second shaft by belt-gearing in such manner that, first, the speed of the driven shaft may be varied; second, the belt may be slackened when not in use; third, friction of loose pulleys may be avoided; fourth, the belt will remain stationary without loss of power when not in use.

Belt-gearing according to this invention is illustrated in the accompanying drawings, by way of example, and hereinafter described by the aid thereof, a single belt being used in such gearing.

In the drawings, Figure 1 is a plan of one form of gearing according to this invention, and Fig. 2 is a front elevation of the driving-pulley thereof with one of the forks of the belt-shifter. Fig. 3 is a plan of another form of the gearing to that shown in Figs. 1 and 2. Fig. 4 is a front sectional elevation of a special arrangement applicable to loose pulleys on which the belt is to rest. Fig. 5 is a diagrammatic view showing how the steps of the pulleys could be arranged. Fig. 6 is a series of side elevations, showing successive positions occupied by the belt in passing from one step to another; and Figs. 7 and 8 are corresponding side elevations of each of the driving and driven cones respectively.

The driving-pulley has three speeds $G'$ $G^2$ $G^3$ $G^4$ and is secured to the driving-shaft A, while secured to the driven shaft B are alternately-arranged fast pulleys $F'$ $F^2$ $F^3$ and loose pulleys $M'$ $M^2$ $M^3$ $M^4$.

Two belt-shifting forks are employed, and these are directed one upward and the other downward to engage the upper and lower parts of the belt, respectively, each consisting of two arms forming a V, the branches $b$ and $c$ being nearer the pulleys than the other branches $a$ $d$. These two V-shaped forks are arranged in such a manner that they can move together both vertically and horizontally in the direction shown by dotted lines $x$ $y$ and $u$ $v$, Figs. 1 and 2. These forks embrace the belt and may be of any desired material and be built up of cylindrical or conical rollers or otherwise, or even take the form of two intersecting oblique surfaces movable one relatively to the other, so that the position of the V they form by their intersection may be altered along a line parallel to $x$ $y$ or $u$ $v$.

When the belt is not in use, it is brought to rest on pulleys $G^4$ $M^4$ of a smaller diameter than those $G^3$ $M^3$ next to them on the two shafts A B, and so slackened. The working of the gearing so arranged is as follows: Assuming that the shaft A is rotating and the belt D is at first on the pulleys $G^4$ $M^4$, if the belt-shifter is operated so as to move the forks toward the right the belt, owing to its slackness and the inclination of the arms of the forks, will be moved at the same time and in such manner that the portion resting on the loose pulley $M^4$ will travel upward. The portion resting on the pulley $G^4$ will travel downward and will pass without difficulty from the step $M^4$ of small diameter onto that $M^3$ of a larger diameter on the other side and from the pulley $G^4$ onto the portion $G^3$ of the driving-pulley on the other side. By continuing to move the forks the belt is moved onto the fast pulley $F^3$ of the driven shaft B and causes the latter to rotate. This position corresponds to that shown at 1, Figs. 6, 7, and 8. As in this position the arm $c$ of the belt-shifter is nearer the pulley $M^3$ than the arm $a$ to the pulley $G^3$, the belt will sag laterally more near the pulley $G^3$ than near $M^3$ under pressure of the shifter, and as a consequence if the later be pushed farther toward the right (position 2, Figs. 6, 7, and 8) the belt will fall onto the smaller step of the pulley $M^3$, and so be slackened, (position 3, Figs. 6, 7, and 8.) By continuing the movement of the belt-shifter in the same direction the belt is again stretched, owing to it being forced to travel up the inclined arms of V-forks, as seen in position 4, Figs. 6, 7, and 8, and as a consequence the belt will pass onto the pulley $G^2$ (positions 5 and 6, Figs. 6 and 7.) When the belt-shifter is moved in the opposite direction, the belt falls at one end from $G^2$ to $G^3$, while at the other end it passes onto the higher step of the loose pulley $M^2$ and afterward onto the pulley $F^3$ and finally returns to the pulleys $G^4 M^4$ and arrives in the position of rest. In this way the belt is held perfectly slack as long as it is not in use and is stretched the moment it is brought into action.

It may sometimes be advisable to have supplementary means (independent of the belt-shifter) for first throwing the belt out of action when changing from one speed to another, and this may be effected by connecting the two shafts A B by means, say, of a bar P, Fig. 1, so that either of the pulleys can be moved longitudinally in the direction indicated by the arrows, or vice versa, before the belt-shifter is operated. The pulleys may thus be moved to such an extent that only half of the belt will be in engagement, so that upon operating the belt-shifter the belt will immediately move in the desired direction.

The general arrangement may be modified in various ways—as, for instance, in order to insure perfect immobility of the belt when not in use the pulleys $G^4$ and $M^4$ may be arranged to freely rotate on the outside of bearings $o$, Fig. 4, supporting the shafts A and B at one end and the loose pulley $G^4$ to move laterally, so that its end may be brought into frictional engagement with the end of $G^3$ and so participate in its rotation. With such an arrangement when the belt D is in a position of rest on pulleys $G^4$ and $M^4$ these pulleys will then both stand still, and the shafts A and B will be able to continue to rotate independently without the belt absorbing any power or the pulleys requiring the least lubrication. When, however, the belt-shifter is moved toward the right, the belt is moved in the same direction and acts simultaneously on the pulley $G^4$, bringing it in contact with the face of $G^3$, so that rotation of the latter is transmitted to the former and to the belt D, which during the movement of the belt-shifter takes up the various positions previously described and passes from one step to another. By arranging the parts of the belt-shifter at a greater or less distance from the pulleys the interval between the dropping of the belt under the action of the arm $b$ or $c$ and the rising of the belt under the action of the arms $a$ or $d$ can be regulated in a very exact manner. This adjustment is also obtainable by varying the inclination of the arms $a\ b\ c\ d$. The pulleys can be limited to one working and one loose one or as many pairs of them as speeds desired, all the inoperative belts remaining, as described, slack and frictionless during the movement of the operative belt.

It is necessary in principle in order that a belt on the driven side should rise well from one step to another that it should rest during its passage only on loose pulleys. Such result may be attained if the alternately-arranged fast and loose driven pulleys above mentioned are replaced by step-pulleys, Fig. 3, which may be changed from loose to fast pulleys, and vice versa, by the aid of a suitable clutch C, which may be thrown into and out of gear by the longitudinal movement of the pulley brought about by the beam P.

The driving-pulley if it is provided with a clutch of some sort can be made in one piece with the loose pulley $G^4$, and where such clutches are employed the pulleys may be mounted loose at both their ends on the outside of the bearings supporting the spindles A and B, so that when the clutches are out of action the pulleys and belt will remain stationary.

When desired, the loose pulleys $G^4 M^4$ can be mounted on fixed spindles in line with the rotating shafts A and B.

Where the distance between the shafts A and B is small and jockey-pulley or any similar means is used for stretching the belt, one of the cones only need be stepped.

The loose pulleys instead of being stepped can, when desired, be made conical, so as to facilitate the rising.

The loose and stepped pulleys can, if found necessary or desirable, be faced with rubber, Fig. 5, or similar material or have their surfaces roughened.

What I claim as my invention, and desire to secure by Letters Patent, is—

1. Belt-and-pulley gearing comprising pulleys of graduated diameters, a power-transmitting band and a band-shifter engaging the upper and lower portions of the band and at different distances from the surfaces of the driving and driven pulleys at each edge of the band.

2. Belt-and-pulley gearing comprising pulleys of graduated diameters, a power-transmitting band and a band-shifter engaging the upper and lower portions of the band and at different distances from the surfaces of the driving and driven pulleys at each edge of the band and having the parts thereof which so engage the edges of the band near the driving and driven pulleys respectively, inclined to one another.

3. In belt-and-pulley gearing comprising driving-pulley of graduated diameter, a power-transmitting-band and a band-shifter engaging the upper and lower portions of the band and at different distances from the surfaces of the driving and driven pulleys at each edge of the band, a driven pulley comprising a plurality of alternately fast and loose sections.

4. Belt-and-pulley gearing comprising driving and driven pulleys of graduated diameters having opposite sections of smaller combined diameter than the working sections, a power-transmitting band and a band-shifter engaging the upper and lower portions of the band and at different distances from the surfaces of the driving and driven pulleys at each edge of the band.

5. Belt-and-pulley gearing comprising driving and driven pulleys of graduated diameters adjustable in the direction of their axes simultaneously in opposite directions, a power-transmitting band and a band-shifter engaging the upper and lower portions of the band and at different distances from the surfaces of the driving and driven pulleys at each edge of the band.

6. Belt-and-pulley gearing comprising pulleys of graduated diameters, a power-transmitting band and a band-shifter engaging the upper and lower portions of the band and at different distances from the surfaces of the driving and driven pulleys at each edge of the band, the driven pulley being capable of being rendered fast or loose on the driven shaft.

In testimony whereof I have signed my name to this specification in the presence of two subscribing witnesses.

AMÉDÉE BOLLÉE, Père.

Witnesses:
ACHILLE MARILLIER,
JEAN ROBELET.